United States Patent
Kjeldsen et al.

(10) Patent No.: US 12,329,132 B2
(45) Date of Patent: Jun. 17, 2025

(54) LOADING AID FOR STACKED TRANSPORT CONTAINERS TO BE FILLED WITH LIVE POULTRY ANIMALS

(71) Applicant: Nordischer Maschinenbau Rud. Baader GmbH + Co. KG, Lübeck (DE)

(72) Inventors: Poul Kjeldsen, Ebeltoft (DK); Jonas Mølgaard Jensen, Hobro (DK)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 858 days.

(21) Appl. No.: 17/285,032

(22) PCT Filed: Oct. 17, 2019

(86) PCT No.: PCT/EP2019/078268
§ 371 (c)(1),
(2) Date: Apr. 13, 2021

(87) PCT Pub. No.: WO2020/079181
PCT Pub. Date: Apr. 23, 2020

(65) Prior Publication Data
US 2021/0337773 A1    Nov. 4, 2021

(30) Foreign Application Priority Data
Oct. 19, 2018   (DE) .................... 10 2018 126 024.5

(51) Int. Cl.
*A01K 45/00*     (2006.01)
*B65G 1/02*      (2006.01)

(52) U.S. Cl.
CPC ............ *A01K 45/005* (2013.01); *B65G 1/026* (2013.01)

(58) Field of Classification Search
CPC .............................. A01K 45/005; B65G 1/026
See application file for complete search history.

(56) References Cited

U.S. PATENT DOCUMENTS 3,244,359 A * 4/1966 Holland .................... B60P 3/04
                                                    119/426
4,480,588 A * 11/1984 Holladay ............... A01K 45/00
                                                    119/455
(Continued)

FOREIGN PATENT DOCUMENTS

CN    101070116 A    11/2007
CN    102884989 A    1/2013
(Continued)

OTHER PUBLICATIONS

International Search Report dated Feb. 20, 2020; International Application No. PCT/EP2019/078268.

*Primary Examiner* — Michael H Wang
(74) *Attorney, Agent, or Firm* — Dinsmore & Shohl LLP (57) ABSTRACT

A loading aid is for temporary intermediate storage of transport containers which are at least partially open to the top, are exclusively empty and are standing ready in a stack during filling with live poultry animals. The aid includes a rack having, on a front side facing the stack, at least two spaced apart vertical support struts and at least two insertion openings for containers arranged above one another between the struts. The rack has, on a rear side, at least two spaced apart vertical support struts. Slide rails extend on both sides of the rack from the struts on the front to struts on the rear to form a receptacle for a container. The rack has at least two receptacles arranged above each other, which is distinguished in that the slide rails on the front side protrude beyond the vertical support struts. A method is also provided.

11 Claims, 4 Drawing Sheets

(56) References Cited

U.S. PATENT DOCUMENTS

| | | | |
|---|---|---|---|
| 6,612,918 B2 * | 9/2003 | Livingston | A01K 45/005 452/53 |
| 2011/0062098 A1 | 3/2011 | Richardson | |
| 2014/0283755 A1 * | 9/2014 | Zanotti | A01K 45/005 119/489 |
| 2015/0124253 A1 | 5/2015 | Zanotti | |
| 2015/0125243 A1 | 5/2015 | Zanotti | |
| 2020/0296939 A1 * | 9/2020 | Rudolph | A01K 45/005 |

FOREIGN PATENT DOCUMENTS

| | | | |
|---|---|---|---|
| CN | 106163271 | A | 11/2016 |
| DE | 202011103194 | U1 | 8/2011 |
| FR | 2989863 | A1 | 11/2013 |
| JP | H03195613 | * | 8/1991 |
| JP | H03195613 | A | 8/1991 |
| KR | 1020090051230 | A | 5/2009 |

* cited by examiner

LOADING AID FOR STACKED TRANSPORT CONTAINERS TO BE FILLED WITH LIVE POULTRY ANIMALS

CROSS REFERENCE TO RELATED APPLICATION

This application is the U.S. National Stage of PCT/EP2019/078268 filed Oct. 17, 2019, which claims priority to German Patent Application No. 10 2018 126 024.5, filed Oct. 19, 2018, the entire content of both are incorporated herein by reference in their entirety.

FIELD OF THE INVENTION

The invention relates to a loading aid, formed and adapted for the temporary intermediate storage of transport containers which are at least partially open to the top, are exclusively empty and are standing ready in a stack formed of at least three transport containers, during filling of the transport containers with live poultry animals, comprising a rack which can be positioned on a solid and flat ground surface, wherein the rack has on a front side facing the stack that is to be filled at least two vertical support struts arranged spaced apart from one another and at least two insertion openings for transport containers arranged one above the other and formed between the vertical support struts, and wherein the rack has on a rear side remote from the stack that is to be filled at least two vertical support struts arranged spaced apart from one another, and wherein slide rails extend on both sides of the rack from the vertical support struts on the front side to the vertical support struts on the rear side to form a receptacle for a transport container, wherein the rack has at least two receptacles arranged one above the other for one transport container, each.

The invention further comprises a method for sequentially filling stacked transport containers which are at least partially open to the top with live poultry animals, comprising the steps: a) removing all the transport containers of a stack formed of at least three empty transport containers from the lowermost transport container of the stack, b) filling the lowermost, empty transport container with live poultry animals, c) stacking a further, empty transport container on the filled transport container, the empty transport container covering the filled transport container, d) filling the further, empty transport container with live poultry animals, e) repeating steps c) and d) until all the transport containers of the stack are filled, and f) covering the topmost, filled transport container of the stack with a lid.

BACKGROUND OF THE INVENTION

In mass animal farming and processing, the poultry animals are kept on farms until they reach slaughter age. As soon as the poultry animals have reached slaughter age, they are transported to a processing plant. To that end, the poultry animals must be collected, or caught, and placed in transport containers. The transport containers are thereby used for the internal transport of the live poultry animals within a farm and for external transport between the farm and the processing plant. The transport containers, so-called crates, boxes, drawers or the like, have a bottom wall and peripheral side walls. The bottom wall and the side walls may be completely closed. Preferably, the bottom wall and the side walls are provided with (ventilation) openings. The transport containers are at least partially open to the top, in order to allow the transport containers to be filled. The transport containers are stackable, in order to allow stacks of, for example, from three to ten transport containers to be formed.

In order to ensure that transport in mass animal farming and processing is as efficient and especially as space-saving as possible, both internally and externally, the empty and filled transport containers, in each of which a plurality of poultry animals can be kept in particular for transport purposes, are correspondingly stacked. The containers are stacked either in a stable rack, which is conventionally made of steel, or directly one on top of the other. In the case where the empty transport containers are stacked in a rack, individual transport containers are, in succession, removed from the rack, filled with the live poultry animals and pushed into the rack again. Handling of the filled transport containers in particular is laborious and complex. The filled transport containers are very heavy and accordingly cannot be carried without aids. Furthermore, when the filled transport containers are inserted into the rack, there is a risk of injury to the poultry animals as a result of shearing action between the transport containers and the rack. Together with the rack, the filled transport containers are then loaded onto the transport vehicles (referred to as trucks hereinbelow) for transport to the processing plant. Apart from the additional space requirement for the racks, so-called dead weight is transported as a result of the racks, which leads to inefficient transport, since the maximum transport load of the trucks is reduced by the racks for the poultry animals.

It is therefore becoming increasingly common, when filling the transport containers, to form a stack from the containers directly and to load the stack onto the trucks without a rack or the like. The empty transport containers return from the processing plant correspondingly stacked. This means that stacks of empty transport containers stand ready at the farms and must be filled again. The topmost (empty) transport containers must first be removed from the lowermost transport container of the stack formed of empty transport containers and intermediately stored somewhere. In order to fill the transport containers, a first transport container (the lowermost of the stack that is to be formed) is then first filled. A further (still empty) transport container is then placed onto the filled transport container so that the filled transport container is covered by the empty transport container. This procedure is continued until the stack is complete. The transport containers that are to be filled one by one must accordingly be fetched from somewhere again in order to form a stack formed of filled transport containers. Finally, the topmost transport container is covered with a lid. Handling of the empty transport containers is difficult and time-intensive. It should be borne in mind that, on a farm, many hundreds of empty transport containers must be handled manually per day. This leads to considerable physical strain on the staff.

SUMMARY OF THE INVENTION

Accordingly, the object underlying the invention is to simplify the handling of the transport containers during filling thereof with live poultry animals and to ensure efficient transport. It is a further object of the invention to propose a corresponding method.

The object is achieved by means of a loading aid of the type mentioned at the beginning in that the slide rails on the front side of the rack facing the stack of transport containers that is to be filled protrude beyond the vertical support struts. By means of the loading aid according to the invention, on the one hand the handling of the transport containers during filling thereof is simplified considerably, since the empty transport containers in their stacked form can be placed at a short distance from the poultry animals to be caught, without having to carry them. The empty transport containers of a stack can simply be pushed backwards into the receptacles of the loading aid and removed therefrom again. This saves time and relieves the strain on the operator. The empty transport containers can be temporarily received by the loading aid, which can be placed in the immediate vicinity of the stacks. The slide rails protruding beyond the support struts ensure that it is possible, on the one hand, to position the loading aid at the stack of empty transport containers and, on the other hand, to establish an operative connection between the loading aid and the individual empty transport containers, which permit simple and temporary intermediate storage of the empty transport containers. On the other hand, the loading aid according to the invention ensures efficient transport, since the transport containers filled with poultry animals can be transported to the processing plants without a rack. The loading aids are intended solely for internal use, in particular on the farms, and, as a flexible module, can be placed at any location on the farm.

Preferably, there is formed on the front side of the rack an additional positioning element for positioning the rack relative to the stack, which positioning element can be brought into operative connection with the lowermost transport container of the stack that is to be filled. The positioning element makes it possible to enter into operative connection with the lowermost transport container directly or by way of a pallet, in order to stabilise the unit formed temporarily— only for the purpose of filling the transport containers—from the loading aid and the stack and orient it for simple pushing of the transport containers into the receptacles of the rack and pulling of the transport containers from the receptacles of the rack. Handling of the transport containers is thereby simplified considerably.

In a preferred further development, the lowermost of the receptacles of the rack is spaced apart from the ground surface at a height which corresponds to the height of the second transport container from the bottom of the stack that is to be filled. Particularly close/tight positioning of the loading aid in front of or at the stack is thereby ensured. Moreover, this configuration also has the result that the loading aid is of reduced weight, so that handling of the loading aid itself, which is of course used at different locations within the farm, for example, is improved.

Advantageously, the rack is made of a light metal, a plastics material, or a material that is comparable in terms of weight. Simple and easy handling of the loading aid between the sites of use within the farm, for example, is thereby ensured.

An expedient embodiment is characterised in that the rack is foldable and/or collapsible as a unit. In addition to simplified handling, this configuration permits the space-saving storage of the loading aid within the farm, for example.

Preferably, the receptacles each have an insertion aid on the front side of the rack facing the stack, in the region of the insertion openings between the two support struts, which insertion aid extends at least over a portion of the entire width. The lifting, or raising, of the empty transport containers of the stack that is to be filled, on the one hand, and the pushing of the transport containers into the receptacles and the pulling of the transport containers out of the receptacles, on the other hand, are thereby assisted.

Advantageously, transport rollers are associated with the rack. Handling of the loading aid between different sites of use is simplified by the transport rollers.

A particularly preferred further development of the invention is characterised in that the rack has an associated handling device which is formed and adapted for lifting the transport containers from the stack, in such a manner that the stacked transport containers can be brought out of engagement with one another at least on the side facing the rack. By means of the handling device, the containers can be lifted individually and in succession or together on the side facing the rack, so that the transport containers can easily be pushed into the receptacles of the rack.

Preferably, the handling device comprises a manually operable lever arm arrangement by means of which all the transport containers of a stack, with the exception of the lowermost transport container, can be lifted and lowered again. Handling of the empty transport containers is thereby simplified and shortens the filling operation as a whole.

A particularly preferred embodiment is characterised in that the vertical support struts on the front side facing the stack have associated adjusting elements which are movable up and down relative to the support struts and which are articulated with the lever arm arrangement, and in that the slide rails on the rear side of the rack are mounted in a stationary and articulated manner on the support struts of the rear side, while the slide rails on the front side of the rack are mounted in a non-stationary and articulated manner in a elongated hole of the adjusting elements. A structurally simple solution which simplifies handling still further is thereby achieved.

Preferably, the handling device is formed and adapted for automatically lifting all the transport containers of a stack, with the exception of the lowermost transport container, and for automatically pulling the transport containers from the stack into the receptacles as well as for automatically pushing the transport containers out of the receptacles to form the stack. By means of this further development, handling is simplified further, so that the strain on the operator is relieved to the maximum.

The object is also achieved by a method having the steps mentioned hereinbefore in that, for removing the transport containers according to step a), a loading aid is placed in front of the stack of empty transport containers that is to be filled and all the transport containers of the stack, with the exception of the lowermost transport container, are pushed into the loading aid for temporary intermediate storage, wherein the empty transport containers for steps c) to e) are pulled one by one, from bottom to top, out of the loading aid onto the already formed stack of filled transport containers as soon as the topmost transport container of the already formed stack of filled transport containers has been filled.

Preferably, the empty transport containers of the stack, with the exception of the lowermost transport container, are lifted by means of a handling device at least on the side facing the loading aid in such a manner that they are out of engagement with one another, in order to allow them to be pushed into the loading aid without encountering any barriers. In other words, the empty and stacked transport containers are released from their operative connection on their front side facing the loading aid, so that they can simply be pushed into the receptacles of the loading aid from the rear side.

An advantageous further development is characterised in that the lifting of the empty transport containers before they are pushed into the loading aid as well as the pushing of the transport containers into the loading aid and the pulling of the transport containers out of the loading aid onto the stack of already filled transport containers are carried out in an automated manner by means of drive elements.

The resulting advantages have already been described in connection with the loading aid, so that reference is made to the corresponding passages in order to avoid repetition.

BRIEF DESCRIPTION OF THE DRAWINGS

Further expedient and/or advantageous features and further developments of the loading aid and of the method will become apparent from the description. Particularly preferred embodiments of the loading aid and the method will be described in greater detail with reference to the accompanying drawing, in which.

DETAILED DESCRIPTION OF THE INVENTION

The loading aid shown in the drawing is formed and adapted for filling a stack formed of five transport containers with live poultry animals. The loading aid is in the same manner also formed and adapted for filling a stack formed of three to ten transport containers. The loading aid is movable and flexibly usable at different sites of use and is formed and adapted solely for the temporary intermediate storage of empty transport containers which are ready for filling with live poultry animals or other products of the food processing industry.

The loading aid 10 shown is formed and adapted for the temporary intermediate storage of transport containers 11 which are at least partially open to the top, are exclusively empty and are standing ready in a stack 12 formed of at least three transport containers 11, during filling of the transport containers 11 with live poultry animals. It comprises a rack 13 which can be positioned on a solid and flat ground surface U, wherein the rack 13 has on a front side V facing the stack 12 that is to be filled at least two vertical support struts 14 arranged spaced apart from one another and at least two insertion openings 15 for transport containers 11 arranged one above the other and formed between the vertical support struts 14, and wherein the rack 13 has on a rear side R remote from the stack 12 that is to be filled at least two vertical support struts 16 arranged spaced apart from one another, and wherein slide rails 17 extend on both sides of the rack 13 from the vertical support struts 14 on the front side V to the vertical support struts 16 on the rear side R to form a receptacle 18 for a transport container 11, wherein the rack 13 has at least two receptacles 18 arranged one above the other for in each case one transport container 11.

A solid and flat ground surface U is to be understood as being a base on which the rack 13 can stand securely in the operation-ready state and while being used as intended. Flatness is not to be understood mathematically. There may be used as the ground surface, for example, a hall floor or a loading surface. Front side and rear side are in principle arbitrarily interchangeable. For the invention, the side of the rack 13 that faces the stack 12 that is to be filled during use as intended is defined as the front side V. The insertion openings 15 are formed only by the spacing of the two support struts 16 and are ultimately only an empty space which allows the transport containers 11 to pass into the rack 13. On opposite sides of the rack 13, a slide rail 17 extends in each case from a front support strut 14 to a rear support strut 16. The slide rails 17, which are spaced apart and preferably in the form of L-shaped profiles, thereby span a plane E. At least two of the planes E are arranged one above the other, the receptacles 18 being formed between the planes E. The spacing A of the planes E is slightly greater than the height H of the transport containers 11. These receptacles 18 are likewise only empty spaces and are accessible to the transport containers 11 through the insertion openings 15. In the receptacles 18, the transport containers 11 rest on the slide rails 17, for example on the left and on the right on a leg of the L-shaped profile in each case.

This loading aid 10 is characterised according to the invention in that the slide rails 17 on the front side V of the rack 13 facing the stack 12 of transport containers 11 that is to be filled protrude beyond the vertical support struts 14. In other words, the slide rails 17 are extended beyond the support struts 14 so that the free ends of the slide rails 17 can each be brought into engagement, or into operative connection, with the stacked and empty transport containers 11. For example, the free ends of the slide rails 17 can engage with, or engage into, the respective transport containers 11 at the underside. In the case where L-shaped profiles are used as slide rails 17, one of the legs can be brought into contact with the underside of the transport containers 11, while the other leg is brought into contact with a side wall of the transport containers 11. In other embodiments, the slide rails 17 can also engage in recesses, for example recessed grips, of the transport containers 11.

The features and further developments described hereinbelow represent preferred embodiments on their own or in combination with one another. It is expressly pointed out that features which are combined in the description and/or the drawing or which are described in a common embodiment can also further develop the above-described loading aid 10 functionally independently.

There is optionally formed on the front side V of the rack 13 a positioning element 19 for positioning the rack 13 relative to the stack 12, which positioning element can be brought into operative connection with the lowermost transport container 11 of the stack 12 that is to be filled. The operative connection can be established directly with the transport container 11 or indirectly, for example by way of a pallet 20 or the like, on which the stack 12 is positioned. The positioning element 19 can be a fork-shaped element. However, other forms, for example as a simple metal sheet, as a plate, as a clamping mechanism or the like, are also possible. The positioning element 19 is preferably arranged at the bottom end, facing the ground surface U, of the vertical support struts 14 and is formed and adapted for engagement into or beneath the lowermost transport container 11 of the stack 12 that is to be filled or the pallet 20 on which the stack 12 is standing. The positioning element 19 can be rigidly fixed to the rack 13. Preferably, however, the positioning element 19 is, for example, foldably arranged on the rack 13. By means of the positioning element 19, the loading aid 10 can be positioned relative to the stack 12, on the one hand. On the other hand, the positioning element 19 additionally imparts stability to the unit formed by the loading aid 10 and the stack 12 during use as intended.

Preferably, the lowermost of the receptacles 18 of the rack 13 is spaced apart from the ground surface U at a height which corresponds to the height of the second transport container 11 from the bottom of the stack 12 that is to be filled. In other words, the slide rails 17 of the lowermost receptacle 18 are situated at a height Hi which is slightly above the top edge K of the lowermost transport container 11 of the stack 12 that is to be formed (see in particular FIGS. 1b and 2b), whereby a space-saving positioning of the loading aid 10 relative to the stack 12 can be achieved.

The rack 13 itself is preferably made of a light metal (such as, for example, aluminium), a plastics material that is approved for use in the food processing industry, or a material that is comparable in terms of weight. Particularly preferably, the rack 13 is in foldable and/or collapsible form as a unit. Alternatively, the rack 13 can also be a rigid shelving element. For stabilisation, the rack 13 can have further struts running horizontally and/or vertically and/or obliquely/diagonally, in addition to the vertical support struts 14, 16 and the slide rails 17.

Preferably, the receptacles 18 each have on the front side V of the rack 13 facing the stack 12 an insertion aid between the two support struts 14, which insertion aid extends at least over a portion of the entire width. These insertion aids, which can be, for example, horizontally extending struts, in each case form the lower boundary for the insertion openings 15 and preferably have rounded edges, so that the insertion of the transport containers 11 into the receptacles 18 (see, for example, arrow $T_{in}$ in FIG. 1a) and the removal of the transport containers 11 from the receptacles 18 (see, for example, arrow $T_{out}$ in FIGS. 1b and 1c) is assisted. Transport rollers 21 are preferably associated with the rack 13. In the embodiment shown (see in particular FIGS. 3 and 4), the transport rollers 21 are associated with the vertical support struts 16 on the rear side R of the rack 13 and have a comparatively large diameter. Instead of the transport rollers 21, cylinders or other slide elements can also be provided at the bottom ends, facing the ground surface U, of the support struts 14, 16 in order to allow the loading aid 10 to be moved with little effort, for example in a warehouse.

Figure 1:
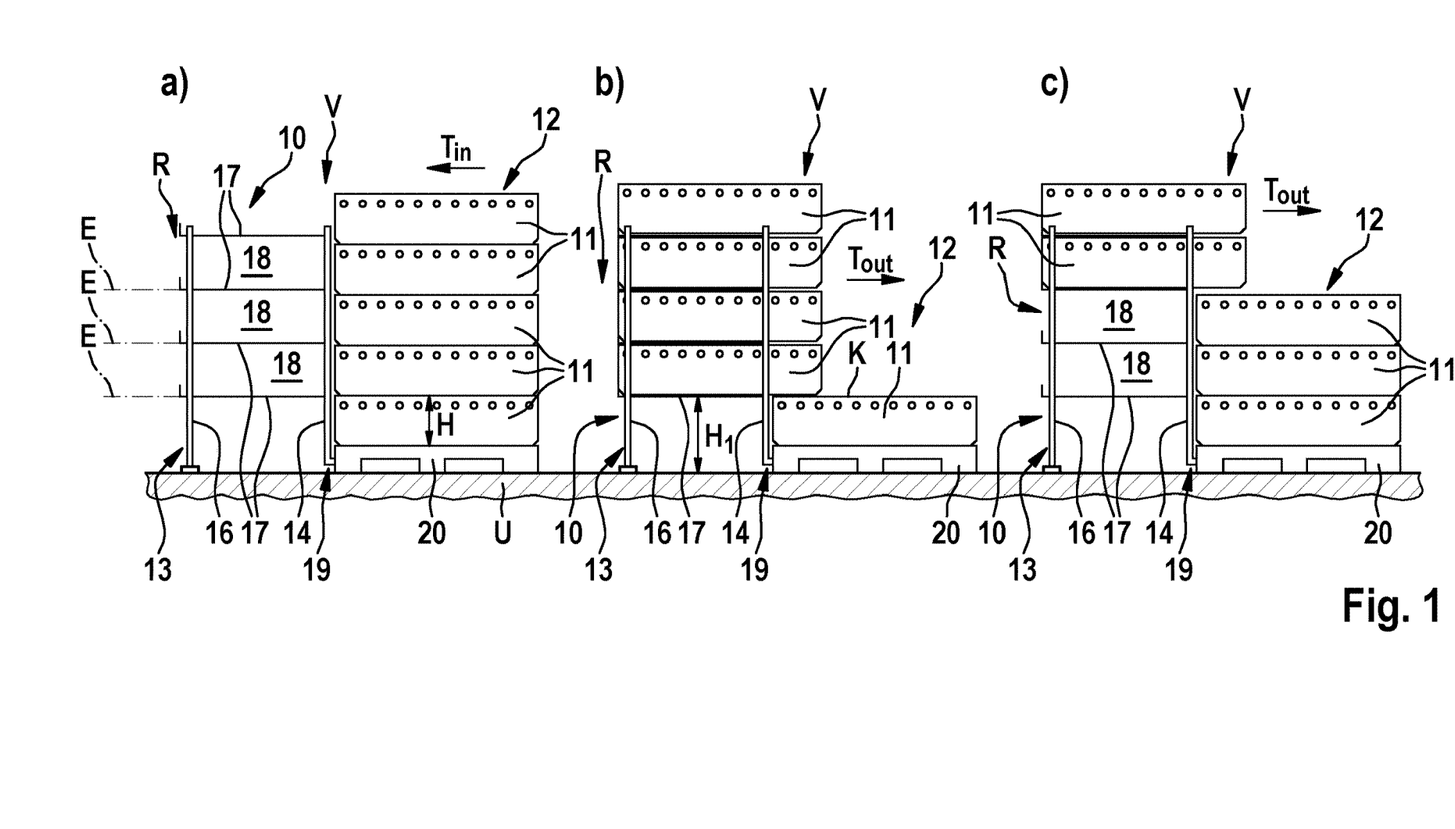
FIG. 1a to c are schematic representations of a first embodiment of the loading aid, wherein the loading aid in FIG. 1a is positioned in front of a stack of empty transport containers that is to be filled, while in FIG. 1b the four upper, empty transport containers of the stack are intermediately stored in the loading aid in order to allow the lowermost transport container of the stack to be filled, while in FIG. 1c three of the transport containers have already been filled or assembled to form a stack again for filling, and two empty transport containers are still intermediately stored in the loading aid.
Figure 2A:
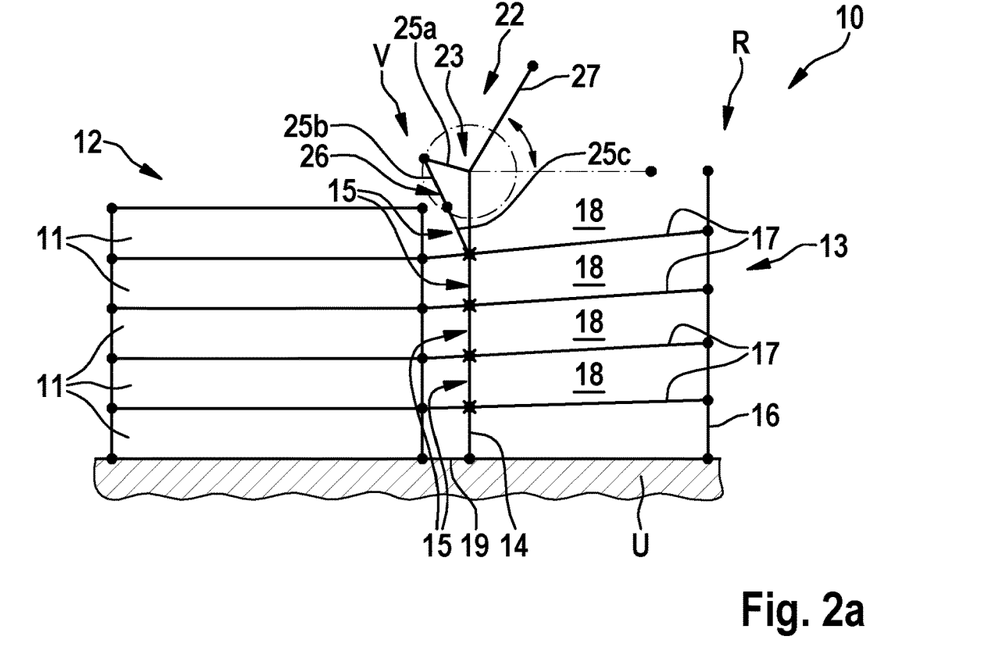
FIGS. 2a and b are schematic representations of a further embodiment of the loading aid having a handling device, wherein the handling device in FIG. 2a is in a starting position in which the transport containers of the stack are still in engagement with one another, while the handling device in FIG. 2b is in a lifting position in which the transport containers have been lifted on the front side facing the rack, so that the transport containers are out of engagement with one another.
Figure 2B:
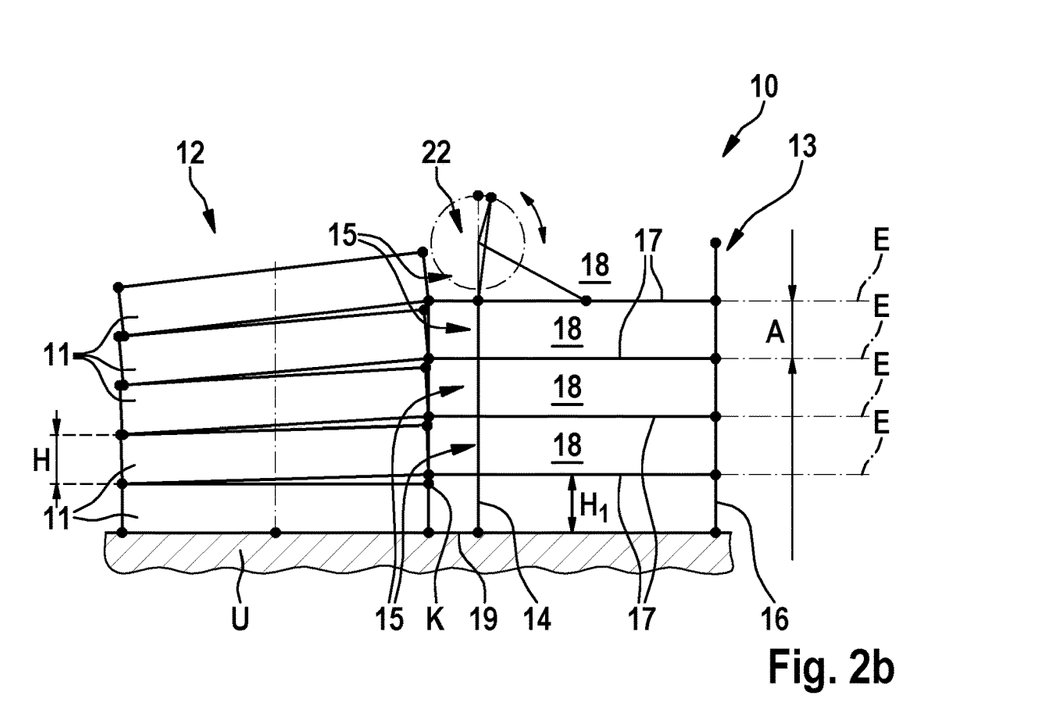
Figure 3:
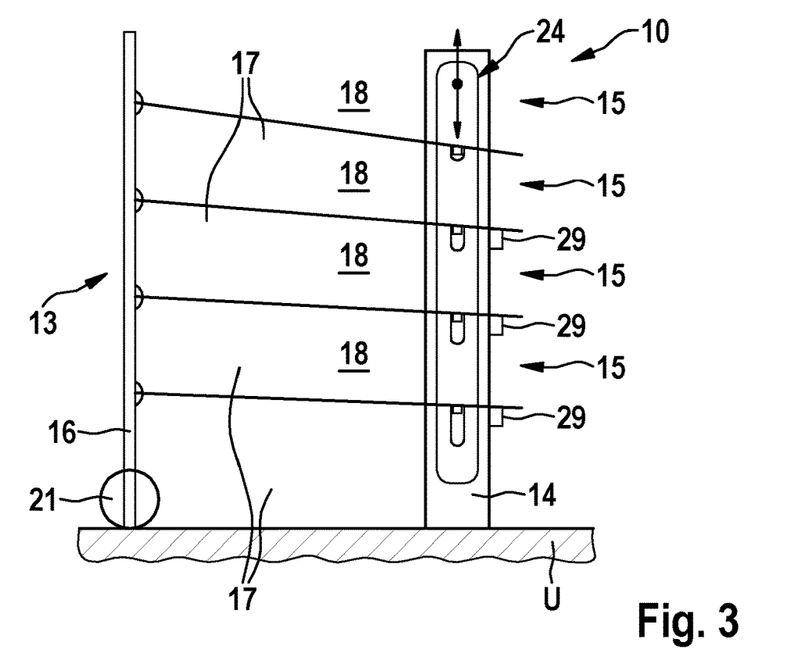
FIG. 3 is a schematic sectional representation of the loading aid having a first embodiment of a handling device in a side view, wherein the handling device is in a receiving position in which the slide rails have been lowered at their free ends.
Figure 4:
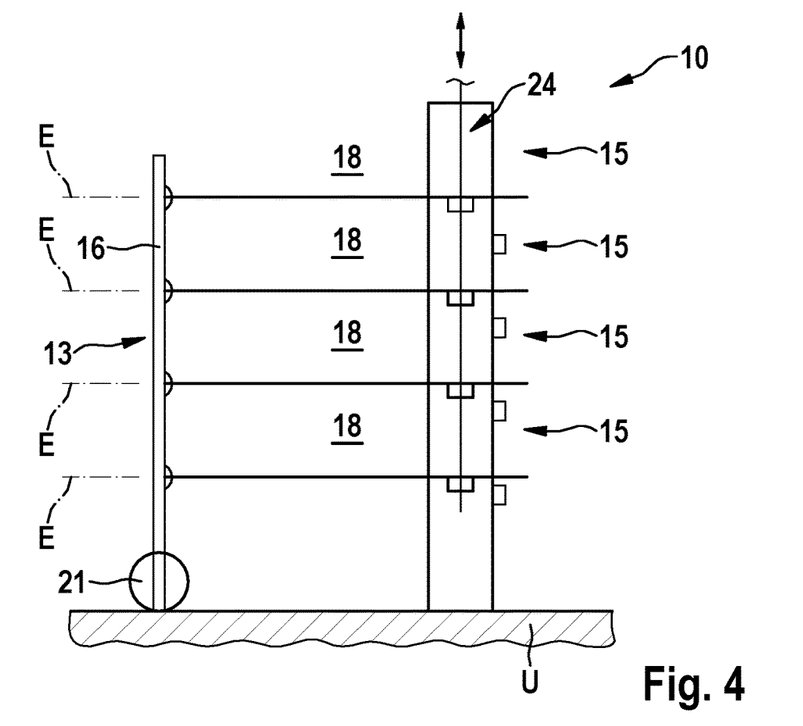
FIG. 4 is a schematic sectional representation of the loading aid having a further embodiment of a handling device in a side view, wherein the handling device is in a lifting position in which the free ends of the slide rails are in a substantially horizontal orientation.

FIGS. 1a to 1c show a simple variant of the loading aid 10. FIGS. 2a and 2b as well as FIGS. 3 and 4 show preferred further developments of the loading aid 10, in which the rack 13 has an associated handling device 22 which is formed and adapted for lifting the transport containers 11 from the stack 12 in such a manner that the stacked transport containers 11 can be brought out of engagement with one another on the side facing the rack 13 (see, for example, FIG. 2b). Preferably, the handling device 22 comprises a manually operable lever arm arrangement 23 by means of which all the transport containers 11 of a stack 12, with the exception of the lowermost transport container 11, can be lifted synchronously or with a time offset and lowered again. However, other mechanical and/or pneumatic and/or hydraulic and/or electrically driven lifting arrangements can likewise be used for lifting and lowering the stacked transport containers 11 of the stack 12.

In the preferred embodiment according to FIGS. 2a, 2b and 3, the vertical support struts 14 situated on the front side V of the rack 13 have associated adjusting elements 24 which are movable up and down relative to the support struts 14 (see, for example, FIG. 3) and which are articulated with the lever arm arrangement 23 (not shown in FIG. 3). The adjusting elements 24, preferably adjusting rails, are arranged on the inner sides, facing one another, of the support struts 14. The adjusting elements 24, or adjusting rails, can be in one-piece or multi-part form. The lever arm arrangement 23 comprises, for each adjusting rail, an adjusting mechanism 26 formed of at least two, preferably three, pivot levers 25a, 25b, 25c which are articulated with one another. At one free end, the adjusting mechanism 26 (pivot lever 25c) is articulated with the adjusting rail. At the other free end, the adjusting mechanism 26 (pivot lever 25a) is mounted on the support strut 14.

By means of an operating lever 27, which is connected to the adjusting mechanism 26, namely at the free end of the pivot lever 25a, which is mounted on the support strut 14, the handling device 22 is movable from a starting position, in which the slide rails 17, starting from the rear side R, slope slightly towards the front side V (see FIG. 2a), into a lifting position, in which the slide rails 17 are oriented substantially horizontally (see FIG. 2b), and back. In other words, the handling device 22 is movable from the starting position (see, for example, FIG. 2a or 3), in which the free ends of the slide rails 17 can be positioned between the stacked transport containers 11 of the stack 12, into the lifting position (see, for example, FIG. 2b or 4), in which the transport containers 11 are out of engagement with one another, and back. The adjusting mechanism 26 thereby overcomes a dead centre in order to be able to remain in the lifting position. Accordingly, the slide rails 17 at the rear side R of the rack 13 are mounted in a stationary and articulated manner on the support struts 16, while the slide rails 17 at the front side V of the rack 13 are mounted on the adjusting elements 24.

Elongated holes 28 are formed in the adjusting elements, in which elongated holes the slide rails 17 are able to move. The size/length of the elongated holes 28 increases from top to bottom, in such a manner that the slide rails 17 of the topmost receptacle 18 travel a longer path on operation of the handling device 22 than the slide rails 17 of the receptacles 18 located therebeneath. In order to limit the downward movement of the slide rails 17, abutment elements 29 are provided in each case.

Each adjusting mechanism 26 can comprise an adjusting lever 27. Preferably, however, a common adjusting lever 27 is provided for both adjusting mechanisms 26. The two adjusting mechanisms 26 are in operative connection with one another by way of a rotary rod which extends from vertical support element 14 to vertical support element 14, in such a manner that the pivoting of the operating lever 27 is transmitted synchronously to both adjusting mechanisms 26.

Cables, chains or other adjusting means can also be used as adjusting elements 24. FIG. 4 shows an embodiment in which the adjusting elements 24 are in the form of a cable 30. Carriers 31 for the slide rails 17 are arranged on the cable 30. When the cable 30 is lifted, the carriers 31 engage in succession with a time offset with the slide rails 17. On lowering, abutment 0, elements 29 again limit the downward movement. The cables 30 can likewise be operated with the lever arm arrangement 23. The lever arm arrangement 23 is optionally also operable in an automated manner, for example by means of a drive.

Figure 5:
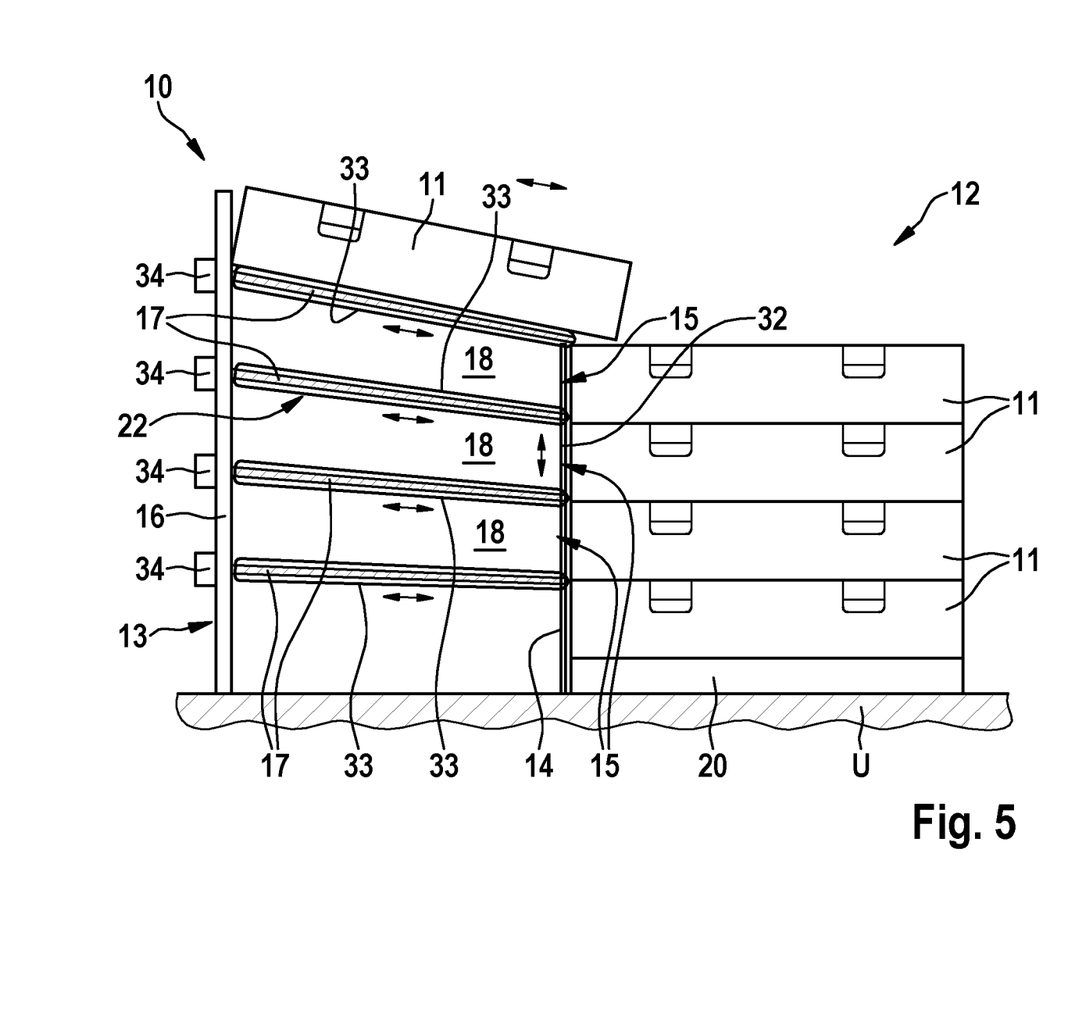
FIG. 5 is schematic representations of a further embodiment of the loading aid having an automated handling device.

FIG. 5 shows a loading aid 10 in which the handling device 22 is formed and adapted for automatically lifting all the transport containers 11 of a stack 12, with the exception of the lowermost transport container 11, and for automatically pulling the transport containers 11 from the stack 12 into the receptacles 18 as well as for automatically pushing the transport containers 11 out of the receptacles 18 to form the stack 12. As in the embodiments described hereinbefore with reference to FIGS. 2a, 2b, 3 and 4, the slide rails 17 can be formed to be movable up and down by means of corresponding drive means in particular on the front side V in the region of the support struts 14. However, the slide rails 17 can also be guided in grooves 32, which are formed in the inner sides, facing one another, of the support struts 14, and formed to be movable up and down by motor, in order to automate the lifting function for lifting and lowering at least the sides of the transport containers 11 facing the rack 13. The slide rails 17 themselves can have associated motor-driven revolving conveyors 33. Preferably, a separate drive 34 is associated with each revolving conveyor 33. The revolving conveyors 33 can also extend over the entire width of the receptacles 18, in such a manner that the transport containers 11 rest, for example, with their entire surface on a revolving conveying belt, by means of which the transport containers 11 can be introduced into the receptacles 18 and also removed from the receptacles 18 again. Instead of the revolving conveyors 33, hydraulically or pneumatically driven rams or the like, for example, can also be used, which are formed and adapted for automatically pulling and pushing the transport containers 11.

The method according to the invention is described in greater detail hereinbelow with reference to the drawing (in particular FIGS. 1a to 1c).

The method serves for the sequential filling of stacked transport containers 11 which are at least partially open to the top with live poultry animals. The empty transport containers 11 are delivered in stacked form to the farms. The stacks 12 usually consist of three or more transport containers 11. Preferably, five empty transport containers 11 form a stack 12. The stacks 12 are preferably placed in the vicinity of the live poultry animals. For filling, all the transport containers 11 of the stack 12 formed of at least three empty transport containers 11 are removed from the lowermost transport container 11 of the stack 12. As a result, the lowermost transport container 11 is at least partially open to the top. The lowermost, empty transport container 11 is then filled with live poultry animals. When the lowermost transport container 11 has been filled, a further, empty transport container 11 is stacked on the filled transport container 11, the empty transport container 11 covering the filled transport container 11, so that the live poultry animals which are in the bottom, already filled transport container 11 are prevented from flying out of the transport container 11. The still empty, further and thus topmost transport container 11 of the stack 12 of transport containers 11 that is to be filled is then filled with live poultry animals. These steps are repeated until all the transport containers 11 of the stack 12 that is to be formed, five transport containers 11 in the embodiment shown, have been filled. Finally, the topmost, filled transport container 11 of the stack 12 is covered with a lid.

According to the invention, for removing the transport containers 11 from the lowermost transport container 11 of the stack 12, a loading aid 10 is placed in front of the stack 12 of empty transport containers 11 that is to be filled. This loading aid 10 is aligned in front of the stack 12 and brought into operative connection therewith, all the transport containers 11 of the stack 12, with the exception of the lowermost transport container 11, being pushed into the loading aid 10 for temporary intermediate storage. When the lowermost transport container 11 of the stack 12 has been filled, the next higher transport container 11 is pulled out of the loading aid 10, the empty transport containers 11 being pulled one by one, from bottom to top, out of the loading aid 10 onto the already formed stack 12 of filled transport containers 11 as soon as the topmost transport container 11 of the already formed stack 12 of filled transport containers 11 is completely filled. When all the transport containers 11 of the stack 12 that is to be formed have been filled and the topmost transport container 11 of the stack 12 has been covered with the lid, the loading aid 10 is removed and transported to a following stack 12 of empty transport containers 11. The stack 12 of filled transport containers 11 released from the loading aid 10 is then brought onto a truck, a trailer or another transport means, in order to transport the stack 12 together with other stacks 12 of filled transport containers 11 to the processing plant.

The handling of the transport containers 11, that is to say the pushing of the transport containers 11 from the stack 12 (optionally after the front side of the transport containers 11 facing the loading aid 10 has been raised) into the loading aid 10 and the removal of the transport containers 11 from the loading aid 10 onto the stack 12 that is to be formed can be carried out manually by an operator. Preferably, the empty transport containers 11 of the stack 12, with the exception of the lowermost transport container 11, are lifted by means of a handling device 22 at least on the side facing the loading aid 10 in such a manner that they are out of engagement with one another, in order to allow them to be pushed into the loading aid 10 without encountering any barriers. As soon as the transport containers 11 are completely free of one another, at least on the side facing the loading aid 10, that is to say there is a gap between the underside/bottom edge of the transport containers 11 and the top side/top edge of the transport container 11 located therebeneath, the transport containers 11 are pushed into the loading aid 10, starting with the topmost transport container 11 of the stack 12. Once the transport containers 11 have been removed in the reverse order, the transport containers 11 can be lowered on the one side again by means of the handling device 22 so that the stacked transport containers 11 are again in engagement with one another and form a stable unit.

The lifting and lowering of the transport containers 11, on the one hand, and the pushing and pulling, on the other hand, can preferably be carried out in an automated manner. Particularly preferably, the loading aid 10 described herein is used for the method.

The invention claimed is:

1. A loading aid, formed and adapted for the temporary intermediate storage of transport containers which are at least partially open to the top, are exclusively empty and are standing ready in a stack formed of at least three transport containers, during filling of the transport containers with live poultry animals, comprising:
- a rack which can be positioned on a solid and flat ground surface;
- the rack has on a front side facing the stack that is to be filled;
- at least two vertical support struts arranged spaced apart from one another; and
- at least two insertion openings for transport containers arranged one above the other and formed between the vertical support struts; and
- the rack has on a rear side remote from the stack that is to be filled;
- at least two vertical support struts arranged spaced apart from one another; and
- the rack further having slide rails extending on both sides of the rack from the vertical support struts on the front side to the vertical support struts on the rear side to form a receptacle for a transport container;
- the rack having at least two receptacles arranged one above the other for in each case one transport container;
- the slide rails on the front side of the rack facing the stack of transport containers that is to be filled protrude beyond the vertical support struts; and
- wherein the rack has an associated handling device which is formed and adapted for lifting the transport containers from the stack, in such a manner that the stacked transport containers can be brought out of engagement with one another at least on the side facing the rack,
- wherein the handling device comprises a manually operable lever arm arrangement by means of which all the transport containers of a stack, with the exception of the lowermost transport container, can be lifted and lowered again, and
- wherein the vertical support struts situated on the front side of the rack have associated adjusting elements which are movable up and down relative to the support struts and which are articulated with the lever arm arrangement, and the slide rails on the rear side of the rack are mounted in a stationary and articulated manner on the support struts of the rear side, while the slide rails on the front side of the rack are mounted in a non-stationary and articulated manner on the adjusting elements.

2. The loading aid according to claim 1, wherein there is formed on the front side of the rack an additional positioning element for positioning the rack relative to the stack, which positioning element can be brought into operative connection with the lowermost transport container of the stack that is to be filled.

3. The loading aid according to claim 1, wherein the lowermost of the receptacles of the rack is spaced apart from the ground surface at a height which corresponds to a height of the second transport container from the bottom of the stack that is to be filled.

4. The loading aid according to claim 1, wherein the rack is made of a light metal, a plastics material, or a material that is comparable in terms of weight.

5. The loading aid according to claim 1, wherein the rack is foldable and/or collapsible as a unit.

6. The loading aid according to claim 1, wherein the receptacles each have an insertion aid on the front side of the rack facing the stack, in the region of the insertion openings between the two support struts, which insertion aid extends over at least a portion of the entire width.

7. The loading aid according to claim 1, further comprising transport rollers associated with the rack.

8. The loading aid according to claim 1, wherein the handling device is formed and adapted for automatically lifting all the transport containers of a stack, with the exception of the lowermost transport container, and for automatically pulling the transport containers from the stack into the receptacles as well as for automatically pushing the transport containers out of the receptacles to form the stack.

9. A method for sequentially filling stacked transport containers, which are at least partially open to the top, with live poultry animals, comprising the steps of:
a) removing all the transport containers of a stack formed of at least three empty transport containers from a lowermost transport container of the stack;
b) filling the lowermost, empty transport container with live poultry animals;
c) stacking a further, empty transport container on the filled transport container, the empty transport container covering the filled transport container;
d) filling the further, empty transport container with live poultry animals;
e) repeating steps c) and d) until all the transport containers of the stack are filled; and
f) covering the topmost, filled transport container of the stack with a lid;
wherein, for removing the transport containers according to step a), a loading aid is placed in front of the stack of empty transport containers that is to be filled and all the transport containers of the stack, with the exception of the lowermost transport container, are pushed into the loading aid for temporary intermediate storage, the loading aid comprising:
- a rack which can be positioned on a solid and flat ground surface;
- the rack has on a front side facing the stack that is to be filled;
- at least two vertical support struts arranged spaced apart from one another; and
- at least two insertion openings for transport containers arranged one above the other and formed between the vertical support struts; and
- the rack has on a rear side remote from the stack that is to be filled;
- at least two vertical support struts arranged spaced apart from one another; and
- the rack further having slide rails extending on both sides of the rack from the vertical support struts on the front side to the vertical support struts on the rear side to form a receptacle for a transport container;
- the rack having at least two receptacles arranged one above the other for in each case one transport container;
- the slide rails on the front side of the rack facing the stack of transport containers that is to be filled protrude beyond the vertical support struts; and
- wherein the rack has an associated handling device which is formed and adapted for lifting the transport containers from the stack, in such a manner that the stacked transport containers can be brought out of engagement with one another at least on the side facing the rack,
- wherein the handling device comprises a manually operable lever arm arrangement by means of which all the transport containers of a stack, with the exception of the lowermost transport container, can be lifted and lowered again, and wherein the vertical support struts situated on the front side of the rack have associated adjusting elements which are movable up and down relative to the support struts and which are articulated with the lever arm arrangement, and the slide rails on the rear side of the rack are mounted in a stationary and articulated manner on the support struts of the rear side, while the slide rails on the front side of the rack are mounted in a non-stationary and articulated manner on the adjusting elements; and wherein the empty transport containers for steps c) to e) are pulled one by one, from bottom to top, out of the loading aid onto the already formed stack of filled transport containers as soon as the topmost transport container of the already formed stack of filled transport containers is completely filled.

10. The method according to claim 9, wherein the empty transport containers of the stack, with the exception of the lowermost transport container, are lifted by means of a handling device at least on the side facing the loading aid in such a manner that they are out of engagement with one another, in order to allow them to be pushed into the loading aid without encountering any barriers.

11. The method according to claim 10, wherein the lifting of the empty transport containers before they are pushed into the loading aid as well as the pushing of the transport containers into the loading aid and the pulling of the transport containers out of the loading aid onto the stack of already filled transport containers are carried out in an automated manner by means of drive elements.

* * * * *